United States Patent
Ferenc et al.

(10) Patent No.: US 8,978,236 B2
(45) Date of Patent: Mar. 17, 2015

(54) METHOD FOR PRODUCING A CONNECTION FOR A MOTOR VEHICLE SEAT AND CONNECTION FOR A MOTOR VEHICLE SEAT

(75) Inventors: Anthony Ferenc, Goodrich, MI (US); Anil Bhat, Pontiac, MI (US); Alan McKeown, Flint, MI (US); Denis Menard, Rochester, MI (US); Sebastian Moser, Rochester, MI (US)

(73) Assignee: Brose Fahzeugteile GmbH & Co. Kommanditgesellschaft, Coburg, Coburg (DE)

( * ) Notice: Subject to any disclaimer, the term of this patent is extended or adjusted under 35 U.S.C. 154(b) by 560 days.

(21) Appl. No.: 13/100,562

(22) Filed: May 4, 2011

(65) Prior Publication Data

US 2011/0272992 A1  Nov. 10, 2011

(30) Foreign Application Priority Data

May 4, 2010  (DE) .......................... 10 2010 028 562

(51) Int. Cl.
| B23P 13/04 | (2006.01) |
| B60N 2/68 | (2006.01) |
| B23K 31/02 | (2006.01) |
| B23K 26/00 | (2014.01) |
| B60N 2/07 | (2006.01) |
| B23K 26/26 | (2014.01) |

(52) U.S. Cl.
CPC ............ *B60N 2/0732* (2013.01); *B23K 26/26* (2013.01); *B60N 2/682* (2013.01); *B23K 2201/006* (2013.01); *B23K 2201/18* (2013.01); *B23K 2203/04* (2013.01); *Y10S 29/048* (2013.01)

USPC ................... 29/557; 29/DIG. 48; 297/452.18; 228/170

(58) Field of Classification Search
USPC ............... 297/452.18, 344.1, 463.2; 248/429; 29/557, 430, 429, 428, DIG. 48; 228/170

See application file for complete search history.

(56) References Cited

U.S. PATENT DOCUMENTS

| 2,121,670 | A | * | 6/1938 | Saives ............................. 29/462 |
| 6,874,746 | B2 | * | 4/2005 | Ganot ........................... 248/430 |
| 2006/0026837 | A1 | * | 2/2006 | Binelli ..................... 29/897.312 |
| 2010/0187885 | A1 | * | 7/2010 | Yamada et al. ............ 297/344.1 |

FOREIGN PATENT DOCUMENTS

| DE | 42 24 063 A2 | 1/1993 |
| DE | 103 42 101 A1 | 4/2005 |
| DE | 102006040796 | 3/2007 |
| DE | 10 2005 060 446 A1 | 6/2007 |
| DE | 10 2009 035 405 A1 | 2/2010 |
| EP | 0 148 472 A2 | 7/1985 |
| FR | 2872103 | 12/2005 |
| JP | 11-1 92 870 A | 7/1999 |
| JP | 2004-1 54 390 A | 6/2004 |

OTHER PUBLICATIONS

Chinese Office Action dated Jul. 29, 2013 from related Chinese Application No. 201110120111.2, 14 pages.

* cited by examiner

*Primary Examiner* — Milton Nelson, Jr.
(74) *Attorney, Agent, or Firm* — Erik G. Swenson; Norton Rose Fulbright US LLP

(57) ABSTRACT

A method for producing a connection for a motor vehicle seat, wherein a seat frame side part is welded to a seat rail to form the connection.

11 Claims, 5 Drawing Sheets

(B)

(A - A)

METHOD FOR PRODUCING A CONNECTION FOR A MOTOR VEHICLE SEAT AND CONNECTION FOR A MOTOR VEHICLE SEAT

CROSS-REFERENCE TO RELATED APPLICATIONS

This application claims the benefit of German Patent Application No. 10 2010 028 562.5, filed May 4, 2010, the entire disclosure of which is herein incorporated by reference.

FIELD OF THE INVENTION

The invention relates to a method for producing a connection for a motor vehicle seat and to a connection for a motor vehicle seat.

Motor vehicle seats conventionally consist of a seat part and a backrest articulated to the seat part. The seat part in turn comprises a seat cushion and a seat frame carrying the seat cushion. The seat frame may in turn consist of various parts, as described in DE 10 2005 060 446 A1 for example.

In particular, a seat frame conventionally comprises two seat frame side parts. The seat frame side parts are conventionally each rigidly connected to an upper seat rail. In subsequent assembly, the motor vehicle, along with the upper seat rail, is connected in a lockable manner to a lower seat rail which is attached rigidly to the floor of the motor vehicle.

It is known internally to the applicant that the seat frame side parts have thus far been connected to the seat rails by riveting. This has disadvantageously been found to be a slow and complex method of assembly.

SUMMARY OF THE INVENTION

The object of the present invention is to provide a simple connection, which can be produced rapidly, between a seat frame side part and a seat rail.

This object is achieved according to the invention by a method and/or by a connection.

Accordingly, a method for producing a connection for a motor vehicle seat is proposed wherein a seat rail side part is welded to a seat rail to form the connection.

A connection for a motor vehicle seat is also provided, comprising a seat rail and a seat frame side part which is welded to the seat rail.

The idea behind the present invention is that the welding is much more rapid and less complex in terms of assembly than the known riveting.

Advantageous configurations and developments of the present invention are to be found in the further dependent claims and the description in conjunction with the figures of the drawings.

In a preferred configuration of the method, the welding step is carried out using a laser. By comparison with other welding methods, laser welding has the advantage that the thermal load on the seat frame side part and the seat rail is comparatively low.

In a more preferred configuration of the method, the welding step comprises welding the seat frame side part to the seat rail in a T-joint. Thus, the seat frame side part can be welded to the seat rail along a substantially straight portion, without the corresponding portion of the seat frame side part having to be subjected to a complex shaping process beforehand, as is required in the known riveting and described at the outset. However, other welding configurations are naturally also conceivable. For example, the seat frame side part could comprise a z-shaped connection part, a central portion of which comes into contact with and is welded to the seat rail. Further, the seat frame side part could also be welded to the seat rail in an overlap joint, in a butt joint with an I seam and/or in a joint with a V seam.

In a more preferred configuration of the method, before the welding step the seat frame side part is formed with a first portion for attaching further seat components and with at least a second portion extending away from the first portion, and the welding step comprises welding the second portion to the guide rail. The second portion thus acts as a spacer between the seat rail and the first portion of the seat frame side part. Further, the second portion, since it typically is not provided for attaching further seat components, need not be of any particular shapes and can therefore easily be welded to the seat rail. The second portion of the seat frame side part preferably extends at an angle of approximately 90° to the first portion. In addition to the second portion, a third portion may be provided which substantially corresponds to the second portion in configuration and function. Together, the first, second and third portion of the seat frame side part may form an approximately inverted-U-shaped configuration.

In a more preferred embodiment of the method, the seat frame side part is trimmed, so as to adapt it to different seat heights of the motor vehicle seat, before the welding step. The seat height of the motor vehicle means the distance, generally known to the person skilled in the art, between a reference point in the region of the motor vehicle floor and a seating reference point (SgRP) of the person sitting in the motor vehicle in the region of his hips. This makes it possible to adapt the seat height of the motor vehicle seat in a simple manner, in particular to different types of motor vehicle. For example, a coupe requires a small seat height, whilst a sports utility vehicle (SUV) requires a large seat height.

In a more preferred embodiment of the method according to the invention, the welding step comprises welding the seat frame side part to the seat rail along the cut edge formed in the trimming step. This results in a simple welding process.

In a more preferred configuration of the method according to the invention, the seat frame side part is formed with at least one recess for mounting on a welding device before the welding step. This makes it possible to mount the seat frame side part on a corresponding welding device before welding, making it considerably easier to orientate the seat frame side part in relation to the seat rail.

In a more preferred configuration of the method according to the invention, the at least one recess for mounting on a welding device is produced at a fixed distance from the cut edge formed during the trimming process. In this way, irrespective of the seat height of the vehicle in which the respective connection is to be used, the same tool or tool arrangement may advantageously be used to form the at least one recess and to trim the seat frame side part. In this way, the tool costs can be reduced considerably. The machining times for the seat frame side part can also be reduced in this way, since there is no need to set the distance between the tool for forming the recess, for example a punch and matrix, and a tool for trimming a seat frame side part. The tool for forming the recess and the trimming tool may be separate tools, or may be integrated into one tool. "Tool arrangement" is to be understood as the relative spatial arrangement of a plurality of tools.

In a more preferred configuration of the method according to the invention, the step of forming the second portion of the seat frame side part comprises formation thereof at a size for the maximum seat height of the motor vehicle seats. Thus, in a first step the second portion of the seat frame side part is to be sized for a maximum seat height of the motor vehicle seat.

For example, the seat frame side part may be cut out from a blank in the first step. The same tool or tool arrangement can be used in the first step or else merely for cutting out (substep) the second portion of the seat frame side part.

In a more preferred embodiment of the method according to the invention, the trimming step comprises trimming the second portion of the seat frame side part for the respectively required seat height of the motor vehicle seat. Thus, the second portion of the seat frame side part should preferably initially be formed so as to be suitably sized for the maximum seat height of the motor vehicle seat using the same tool or tool arrangement. Subsequently the second portion of the seat frame side part is trimmed, for example in a manner dependent on whether the connection is to be produced for a motor vehicle seat for a coupe or for an SUV, i.e. for example shortened to the required length.

In a more preferred configuration of the method according to the invention, the at least one recess for mounting on a welding device is formed in the second portion of the seat frame side part. In this way, the seat frame side part can be kept very close to the welding seam which is to be formed along the cut edge, resulting in a positive effect on the tolerances which are to be met.

In a more preferred configuration of the method according to the invention, when producing connections for motor vehicle seats having different seat heights, in particular before the trimming step, the first portion of the seat frame side part is formed with the same tool or tool arrangement. The first portion is to be used for attaching further seat components. For example, the first portion may comprise means, for example recesses, to which or by means of which further seat components, for example a seat mechanism, can be attached. In the present case, "recesses" means indentations and/or through-holes. For example, the first portion may comprise a particular hole pattern. In accordance with the present development, the same tool or tool arrangement can be used yet again to form this hole pattern, irrespective of the seat height, saving on tool costs.

Unless stated otherwise, the above-described configurations of the present invention can be combined freely with one another.

The configurations described for the method according to the invention apply correspondingly to the connection according to the invention for a motor vehicle seat.

BRIEF DESCRIPTION OF THE DRAWINGS

In the following, the present invention is described in greater detail by way of the embodiments shown in the figures of the drawings, in which.

DESCRIPTION OF EXEMPLARY EMBODIMENTS

Figure 1:
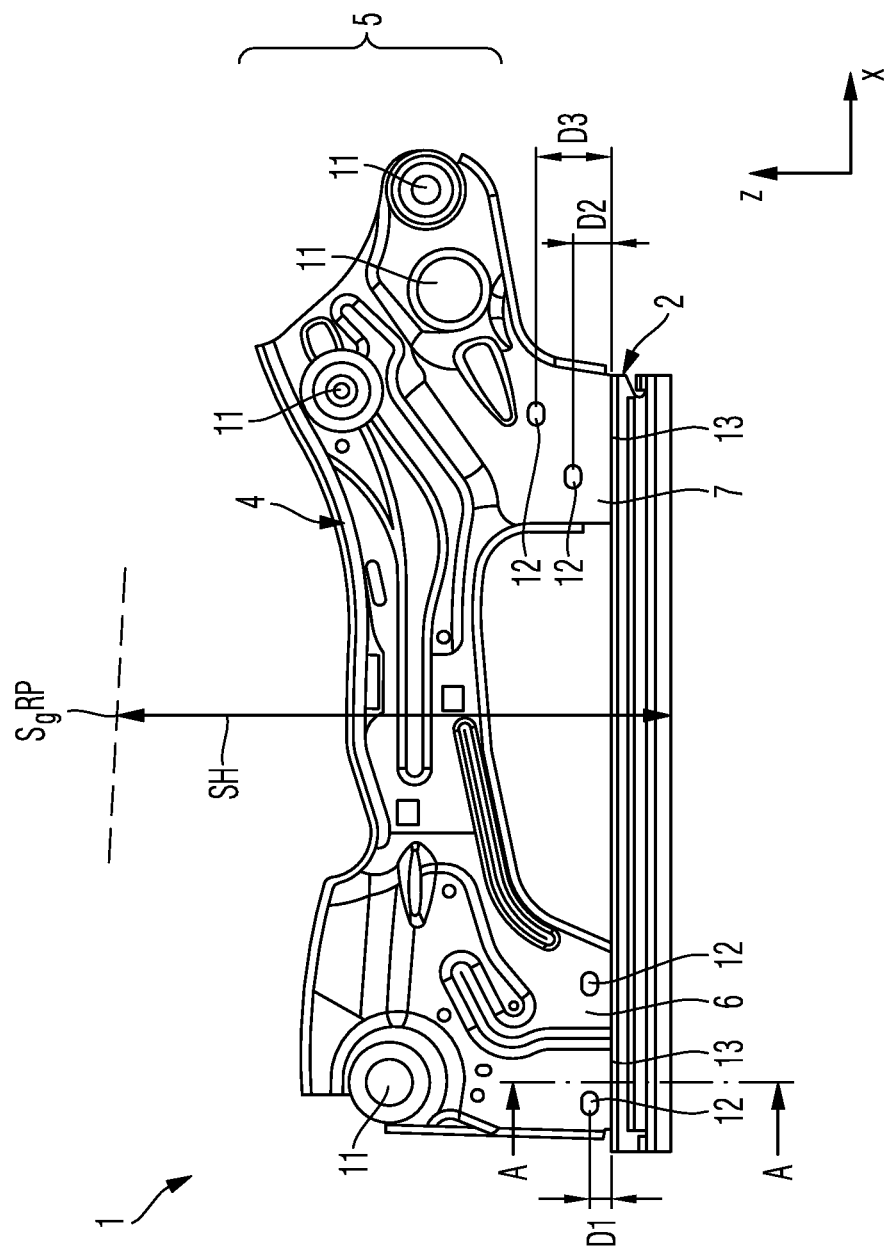
FIG. 1 is a plan view of a connection for a motor vehicle seat having a maximum seat height according to one embodiment of the present invention.

In the figures of the drawings, unless stated otherwise, like reference numerals denote like components, elements and features.

FIG. 1 is a plan view of a connection 1 for a motor vehicle seat having a maximum seat height SH according to one embodiment of the present invention.

The seat height SH denotes the distance from a reference point on the floor of the vehicle to a seating reference point or seating reference line SgRP. The seating reference point SgRP denotes the usual position of the hips of the person sitting in the motor vehicle. The rest of the motor vehicle is not shown in FIG. 1 and FIG. 2.

The connection 1 comprises a seat rail 2. In the present embodiment, the seat rail 2 is an upper seat rail of a motor vehicle seat, which cooperates with a lower seat rail attached to the floor of the motor vehicle so as to make the motor vehicle seat displaceable in the travel direction X of the motor vehicle. The seat rail 2 is typically formed as a profiled steel part, and comprises an approximately planar upper face 3, as can be seen from FIG. 6, which shows a partial section A-A according to FIG. 1.

Returning to FIG. 1, this further shows a seat frame side part 4, which is also a component of the connection 1.

The seat frame side part 4 is composed for example of a first, second and third portion 5, 6 and 7.

The first portion 5 is used to attach further seat components (not shown), for example a seat mechanism. For this purpose, the first portion 5 comprises a plurality of means 11. The means 11 may for example be formed as recesses or integral formations and can be connected to the corresponding seat components.

The second and third portion 6 and 7 are attached, facing towards the seat rail 2, to the first portion 5. The first, second and third portion 5, 6 and 7 thus form an approximately inverted-U-shaped configuration.

The second and third portion 6 and 7 are each formed for example with two recesses 12. The recesses 12 are used to mount the seat frame side part 4 on a welding device 16 shown in FIG. 6.

Figure 5:
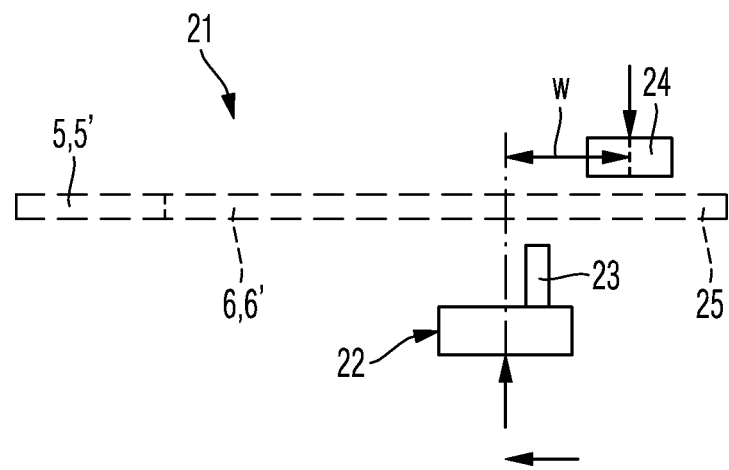
FIG. 5 is a view B according to FIG. 4.

The second and third portion 6 and 7 each comprise a lower edge 13. As can be seen from FIG. 6, the seat frame side part 4 is connected to the upper face 3 of the rail 2 along the edges 13 by a weld seam 14. The weld seam 14 is in particular a laser weld seam. As is shown in FIG. 5, the second and third portion 6 and 7 are welded to the rail 2 in a T joint.

As is further shown in FIG. 1, the recesses 12 are at distances D1, D2 and D3 respectively from the edge 13.

The configuration of the seat frame side part 4 according to the embodiment of FIG. 1 results in a seat height of for example 240 mm for a motor vehicle seat which is produced using the seat frame side part 4. This seat height is suitable in particular for SUVs, i.e. for vehicles having a comparatively large seat height.

Figure 2:
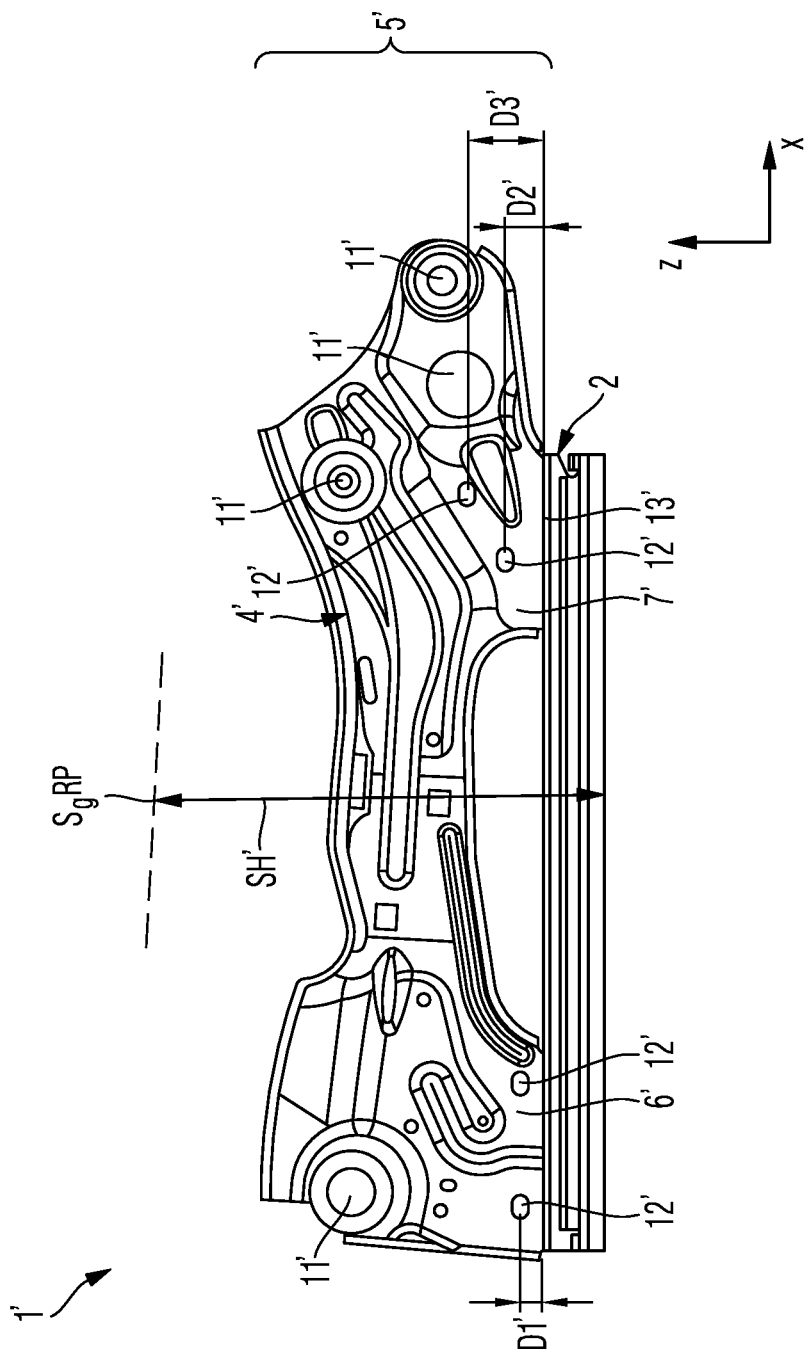
FIG. 2 is a plan view of a connection for a motor vehicle seat according to a further embodiment of the present invention having a reduced seat height by comparison with the embodiment of FIG. 1.

FIG. 2 is a plan view of a connection 1' for a motor vehicle seat having a reduced seat height SH' by comparison with the embodiment of FIG. 1. The seat height SH' is 210 mm for example. A low seat height of this type is required for example when using the connection 1' in a coupe or the like.

To achieve this reduced seat height SH', the side part 4' is formed with shorter second and third portions 6' and 7'. "Short" refers to a direction perpendicular to the upper face 3 of the seat rail 2 or the upward direction Z of the motor vehicle when the connection 1 is constructed therein. However, the first portion 5' of the seat frame side part 4' of the connection 1' is formed identically to the first portion 5 of the seat frame side part 4 of the connection 1 according to FIG. 1. The first portions 5 and 5' of the connections 1 and 1' can therefore be produced using the same tool or tool arrangement.

Figure 6:
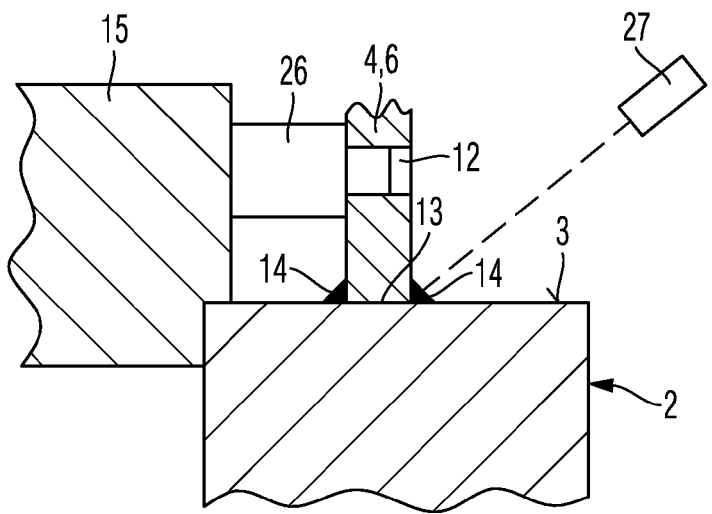
FIG. 6 is a partial section A-A according to FIG. 1, a welding device additionally being shown by comparison with FIG. 1.

Further, the recesses 12' for mounting on the welding device 15, see FIG. 6, are at the same distances D1, D2' and D3' from the edge 13' as the recesses 12 from the edge 13 in the connection 1 according to the embodiment of FIG. 1, in which see reference numerals D1, D2 and D3. This means that a simplified tool or tool arrangement can be used to produce the recesses 12 and 12' and the edges 13 and 13', as will be explained in greater detail in the following.

Figure 3:
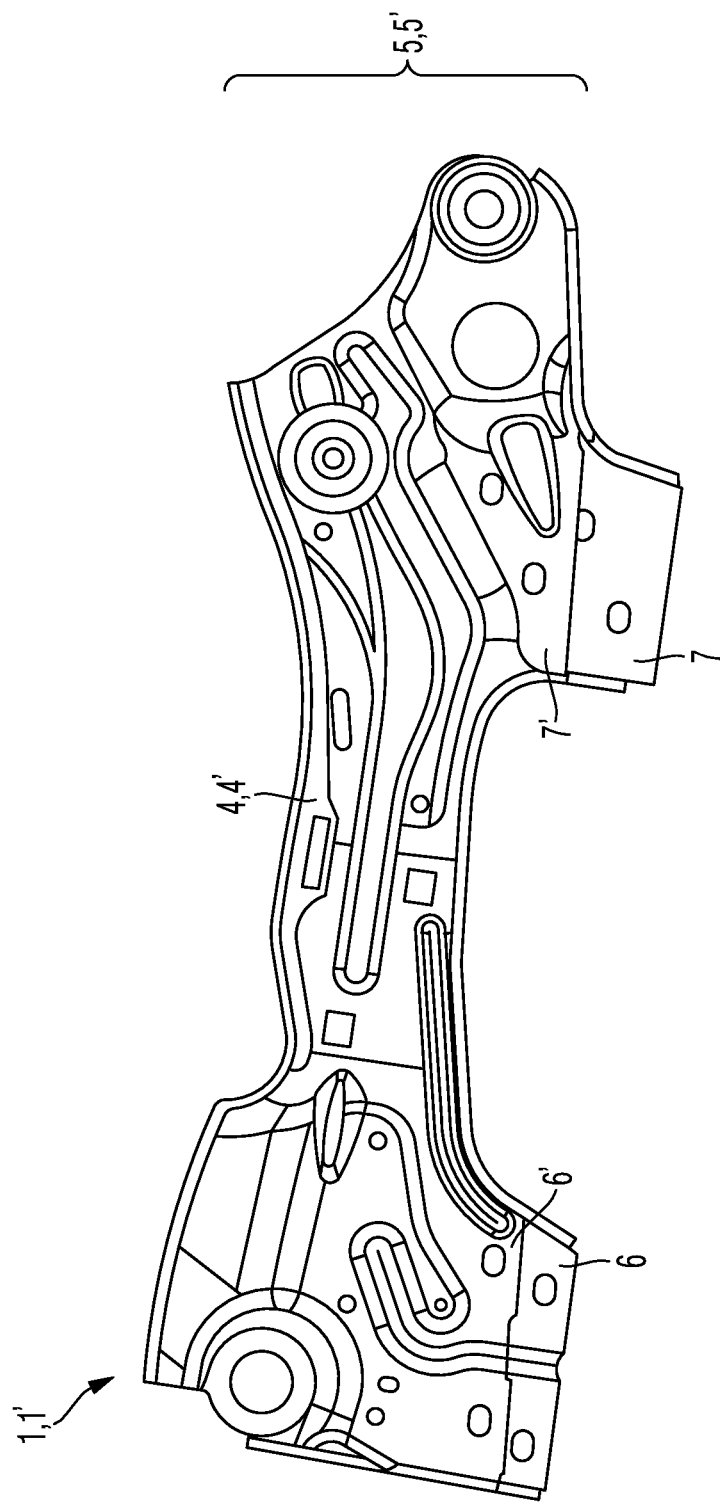
FIG. 3 is a plan view of the seat frame side parts from FIGS. 1 and 2 placed on top of one another.

To illustrate this more clearly, FIG. 3 shows a plan view of the seat frame side parts 4 and 4' from FIGS. 1 and 2 laid on top of one another.

In particular, FIG. 3 demonstrates the identical construction of the first portion 5 and 5' of the seat frame side parts 4 and 4', as well as the different configuration of the second portions 6 and 6' and the different configuration of the third portions 7 and 7'.

Figure 4:
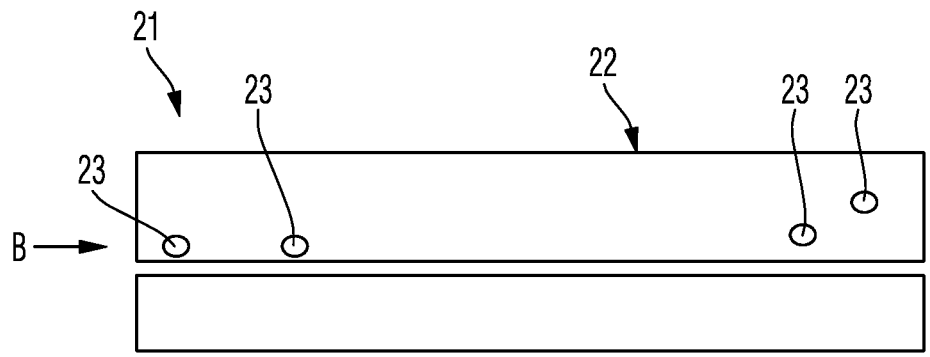
FIG. 4 is a plan view of a tool arrangement for producing the seat frame side parts according to FIGS. 1 and 2.

FIG. 4 is a plan view of a tool arrangement 21 for producing the seat frame side parts 4 and 4' and FIG. 5 is a view B according to FIG. 4.

Figure 7:
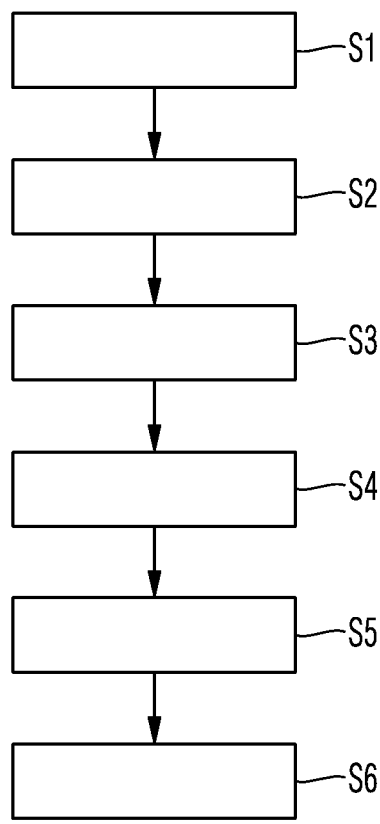
FIG. 7 is a flow chart of a method according to an embodiment of the present invention.

FIG. 7 is a flow chart of the method for producing the connections 1 and 1' according to one embodiment of the present invention. This method is explained in greater detail in the following, referring in particular to FIGS. 4, 5 and 6.

In a preferred configuration of the method, the seat frame side part 4 is configured for the maximum seat height SH. For this purpose, it is produced from a substantially planar blank, in particular punched and/or deep-drawn, in a first method step S1 using a tool or tool arrangement. The seat frame side part 4 also forms the starting point even for seat frame parts 4' which have a reduced seat height SH' by comparison with the maximum seat height. Accordingly, the same tool or tool arrangement can thus advantageously again be used for this first step S1. In this first step S1, the seat frame side part 4 is preferably formed with all of the features shown in FIG. 1, apart from the recesses 12. Moreover, the first and second portion 6 and 7 may also comprise a particular excess 25, for which see FIG. 5, in the region of the edges 13 which are to be formed. Alternatively, however, the edges 13 of the seat frame side part 4 could also likewise be produced in method step S1.

Subsequently, in a further method step S2, the recesses 12 are formed using a tool 22 from the tool arrangement 21 shown in FIG. 4. The tool 22 is in particular a punching tool comprising punches 23 for punching out the recesses 12 from the second and third portion 6 and 7 of the seat frame side part 4.

Before, during or after step S2, the second and third portion 6 and 7 are trimmed in a step S3 to form the edges 13, using a tool 24 from the tool arrangement shown in FIG. 4. As stated previously, step S3 can be omitted if the sides 13 of the seat frame side part 4 have already been produced in step S1.

FIG. 5, which is the view B according to FIG. 4, schematically illustrates steps S2 and S3. FIG. 5 shows the second portion 6 of the seat frame side part 4, which is laid in the tool arrangement 21, in dashed lines. The tool 22 along with the punch 23 thereof is moved upwards, as shown by the arrow, to punch out the recesses 12 from the second portion 6. The tool 24 travels downwards in the direction of the arrow to trim the second portion 6 so as to form the edge 13, removing the excess 25.

However, if the seat frame side part 4' for the reduced seat height SH' is to be produced instead of the seat frame side part 4 for the maximum seat height SH, the tool arrangement 21 in FIG. 5 is displaced to the left, i.e. towards the second portion 5', as shown by the arrow. Subsequently the tool 22 travels upwards and the tool 24 travels downwards, as described above, to produce the recesses 12' and the edges 13'. The distance W of the tool 22 from the tool 24 always remains the same, irrespective of whether the seat frame side part 4 for the maximum seat height SH or the seat frame side part 4' for the reduced seat height SH' is to be produced. In this way, processing times for producing the seat frame side part 4, 4' can be reduced.

In a further method step S4, the seat frame side part 4 is subsequently mounted on the welding device 15 shown in FIG. 6. For this purpose, pegs 26, for example, of the welding device 15 engage in the recesses 12 of the seat frame side part 4.

In a further method step S5, the seat frame side part 4 is positioned in such a way relative to the rail 2 that the edges 13 of the seat frame side part 4 come into contact with the upper face 3 of the rail 2.

Subsequently, in a method step S6, the seat frame side part 4 is welded along the edges 13 using a laser 27, the weld seams 14 being formed for example as fillet welds. If the seat frame side part 4' for the reduced seat height SH' is to welded to the rail 2 the same welding device 15 may advantageously be used for welding the seat frame side parts 4 and 4' because of the distances D1, D2 and D3 corresponding to the distances D1', D2' and D3', for which see FIGS. 1 and 2.

The production of the connection 1 or 1' is thus complete.

Although the invention has been described entirely by way of preferred embodiments, it is not restricted by these, but can be modified in numerous ways. In particular, features of the individual embodiments described above may be combined with one another in any desired manner. In particular, the features described above for the method apply correspondingly to the connection produced.

The materials, numbers of parts and dimensions should be understood as being exemplary, and are merely used to illustrate the embodiments and developments of the present invention.

LIST OF REFERENCE NUMERALS 1, 1' connection
2 rail
3 upper face
4, 4' seat frame side part
5, 5' first part
6, 6' second part
7, 7' third part
11, 11' means
12, 12' recess
13, 13' edge
14 weld seam
15 welding device
21 tool arrangement
22 tool
23 punch
24 tool
25 excess
26 peg
27 laser
SgRP seating reference point
SH seat height
SH' reduced seat height W distance
X travel direction
Z upward direction

The invention claimed is:

1. A method for producing a connection for a motor vehicle seat, wherein a seat frame side part is welded to a seat rail to form the connection, wherein the seat frame side part is trimmed, so as to adapt it to different seat heights of the motor vehicle seat, before the welding step, wherein before the welding step the seat frame side part is formed with a first portion for attaching further seat components and with at least a second portion extending away from the first portion, wherein the second portion acts as a spacer between the rail and the first portion of the seat frame side part, and the welding step comprises welding the second portion to the seat rail.

2. The method according to claim 1, wherein the welding step is carried out using a laser.

3. The method according to claim 1, wherein the welding step comprises welding the seat frame side part to the seat rail in a T joint and/or welding a z-shaped attachment part of the seat frame side part to the seat rail.

4. The method according to claim 1, wherein the trimming step comprises trimming a second portion of the seat frame side part for a respectively required seat height of the motor vehicle seat.

5. The method according to claim 1, wherein when producing connections for motor vehicle seats having different seat heights before the trimming step, the first portion of the seat frame side part is formed with only one tool or only one tool arrangement.

6. The method according to claim 1, wherein the welding step comprises welding the seat frame side part to the seat rail along a cut edge formed in the trimming step.

7. The method according to claim 1, wherein the step of forming the second portion of the seat frame side part comprises formation thereof at a size for a maximum seat height of the motor vehicle seat.

8. The method according to claim 1, wherein the seat frame side part is formed with at least one recess for mounting on a welding device before the welding step.

9. The method according to claim 8, wherein the at least one recess for mounting on the welding device is produced at a fixed distance from a cut edge formed during the trimming process.

10. The method according to claim 8, wherein the at least one recess for mounting on the welding device is formed in a second portion of the seat frame side part.

11. A method for producing a connection for a motor vehicle seat, wherein a seat frame side part is welded to a seat rail to form the connection, wherein the welding step comprises welding the seat frame side part to the seat rail along a cut edge formed in a trimming step, wherein at least one recess for mounting on a welding device is produced at a fixed distance from the cut edge formed during the trimming step, wherein a step of forming a second portion of the seat frame side part comprises formation thereof at a size for a maximum seat height of the motor vehicle seat, wherein the trimming step comprises trimming the second portion of the seat frame side part for a respectively required seat height of the motor vehicle seat, wherein when producing the connection for a plurality of motor vehicle seats having different seat heights before the trimming step, the first portion of the seat frame side part is formed with only one tool or only one tool arrangement.

* * * * *